United States Patent
Corbet et al.

(10) Patent No.: US 7,771,113 B2
(45) Date of Patent: Aug. 10, 2010

(54) SENSOR RATIONALITY DIAGNOSTIC

(75) Inventors: Todd Corbet, Franklin, IN (US); Ross C. Berryhill, Nashville, IN (US); Daniel R. Harshbarger, Columbus, IN (US)

(73) Assignee: Cummins Filtration IP, Inc, Minneapolis, MN (US)

( * ) Notice: Subject to any disclaimer, the term of this patent is extended or adjusted under 35 U.S.C. 154(b) by 383 days.

(21) Appl. No.: 11/771,673

(22) Filed: Jun. 29, 2007

(65) Prior Publication Data

US 2009/0003405 A1   Jan. 1, 2009

(51) Int. Cl.
*G01K 15/00* (2006.01)
*G01K 13/00* (2006.01)

(52) U.S. Cl. .......................... 374/1; 374/112; 374/144; 374/183; 374/166; 702/99; 702/130; 702/104; 702/133

(58) Field of Classification Search ............... 374/1, 374/112, 144, 183, 166
See application file for complete search history.

(56) References Cited

U.S. PATENT DOCUMENTS

| | | | |
|---|---|---|---|
| 5,706,652 A | 1/1998 | Sultan | 60/274 |
| 6,684,154 B2* | 1/2004 | Isobe et al. | 701/114 |
| 6,849,239 B2 | 2/2005 | Morris | |
| 6,907,343 B2* | 6/2005 | Tsukamoto et al. | 701/114 |
| 6,915,629 B2* | 7/2005 | Szymkowicz | 60/289 |
| 7,069,773 B2 | 7/2006 | Stempnik | |
| 7,082,752 B2 | 8/2006 | Plote et al. | 60/277 |
| 7,137,248 B2* | 11/2006 | Schaller | 60/297 |
| 7,138,901 B2 | 11/2006 | Seshadri et al. | 338/25 |
| 7,162,860 B2 | 1/2007 | Shirakawa et al. | 60/277 |
| 7,216,478 B2 | 5/2007 | Brown et al. | 60/277 |
| 2003/0126858 A1* | 7/2003 | Strohmaier et al. | 60/285 |
| 2004/0013165 A1* | 1/2004 | Plote et al. | 374/172 |
| 2004/0118108 A1* | 6/2004 | Ripper et al. | 60/286 |
| 2007/0047616 A1* | 3/2007 | Izumiura et al. | 374/144 |
| 2007/0101699 A1 | 5/2007 | McNulty et al. | 60/285 |
| 2007/0220867 A1* | 9/2007 | Clerc et al. | 60/288 |

OTHER PUBLICATIONS

Nelson et al., The Development of RTD Temperature Sensor for Exhaust Applications, Diesel Exhaust Emission Control E SP-1860, 2004-01-1421, Mar. 11, 2004.
PCT/US2008/068842 International Search Report and Written Opinion, Sep. 9, 2008.

* cited by examiner

*Primary Examiner*—Gail Verbitsky
*Assistant Examiner*—Mirellys Jagan
(74) *Attorney, Agent, or Firm*—Kunzler Needham Massey & Thorpe (57) ABSTRACT

A sensor diagnostic method, such as to determine rationality of one of three temperature sensors used in an exhaust aftertreatment system, includes determining the temperature difference between the first and second sensor, determining the temperature difference between the second and third sensor, determining whether the temperature differences are within an acceptable threshold range and comparing the two temperature differences to determine which sensor is in error, if any.

21 Claims, 5 Drawing Sheets

| FAULT | DOC High 910 | DOC Low 920 | DOC OK 930 |
|---|---|---|---|
| DPF High 940 | Two Thermistors | Thermistor 425 | Thermistor 435 |
| DPF Low 950 | Thermistor 425 | Two Thermistors | Thermistor 435 |
| DPF OK 960 | Thermistor 415 | Thermistor 415 | No fault |

FIG. 9

SENSOR RATIONALITY DIAGNOSTIC

BACKGROUND OF THE INVENTION

1. Field of the Invention

This invention relates to sensor rationality diagnostics, more particularly, it relates to emission or exhaust control systems of internal combustion engines and apparatuses, systems, and methods for diagnosing functionality of temperature sensors associated with exhaust aftertreatment catalyst/filter systems. More specifically the invention relates to apparatuses, systems, and methods for verifying in-range thermistor rationality in exhaust aftertreatment catalyst/filter systems.

2. Description of the Related Art

Catalyst/filter aftertreatment systems for diesel particulate matter are designed to catch particulate matter or soot in diesel particulate filter (DPF). The DPF over time becomes filled with the particulate matter and must be cleaned. One method of cleaning a DPF is by burning off the accumulated particulate through the use of a diesel oxidation catalyst (DOC).

A DOC is a flow through device containing a honeycomb like substrate coated with a precious metal such as platinum or palladium. The catalyst interacts with the exhaust as it passes through the DOC, raising the temperature of the exhaust and causing the particulate matter to burn. The combination of a DPF and a DOC in an exhaust aftertreatment system for diesel particulate matter has been used to prevent harmful pollutants from entering the atmosphere.

Diesel particulate matter combusts at temperatures above 500 degrees Celsius. As particulate matter combusts, additional temperature increases may be seen. These high temperatures may be above the temperature at which the filter material maintains its structure. Temperature sensors have been used to monitor temperatures in diesel exhaust aftertreatment systems utilizing DOCs and DPFs. The sensors are often thermistors which provide varying degrees of electrical resistance depending on the temperature in which they are operating. The information provided by the sensors is used to diagnose potential problems in the aftertreatment system and also to control efficient regeneration of the DPF.

According to government regulations, heavy-duty engines produced in 2007 and subsequent model years are required to be equipped with an Engine Manufacturer Diagnostic (EMD) system. The EMD system must be capable of monitoring emission systems to detect malfunctions and notify the operator of such malfunctions. Where determined by the engine manufacturer to be feasible, the EMD system must detect malfunctions of input components such as thermistors on the emission system. In particular, in-range rationality refers to detecting temperatures within the operating range of the system which are not rational for the particular operating condition of the engine or exhaust aftertreatment system.

Example methods used to test exhaust gas temperature thermistors for rationality include a key-on diagnostic which compares the thermistor readings to engine coolant temperature, intake temperature or engine temperature to see if there is a gross difference between the temperatures measured. The key-on diagnostic must compare exhaust temperatures with systems unrelated to exhaust, and is suited to find temperature sensor readings that are grossly in error, but not sensors which are offset from the true temperature reading.

Another method, called a dither, looks at whether the thermistor temperatures are changing over time. According to this method, temperatures are measured over a long period of time to determine whether the temperature reading is stuck at one point. This method is not able to detect sensors which are offset from the true temperature but changing accurately as the temperature changes.

The current invention can replace or be used in conjunction with previously developed thermistor rationality diagnostics and is applicable to all vehicle platforms and existing aftertreatment systems. It can also be configured for any type of sensor—pressure, flow, etc.—in a wide range of applications. The diagnostic can be used with all products with catalyst elements and at least three temperature sensors. The current invention provides a method, system and apparatus for diagnosing thermistors which are stuck within range as well as thermistors which are offset.

From the foregoing discussion, it should be apparent that a need exists for a thermistor diagnostic which is applicable to all vehicle platforms and uses existing aftertreatment systems components. The diagnostic must be compatible with all products with catalyst elements and temperature sensors. The diagnostic must be able to diagnose thermistors which are stuck within range as well as thermistors which are offset from the true temperature reading.

SUMMARY OF THE INVENTION

In one aspect of the invention, a sensor diagnostic method is disclosed in which a first sensor senses a first value, a second sensor senses a second value, and a third sensor senses a third value. The method compares a first difference between the value measured at the first sensor and the value measured at the second sensor to determine whether the difference between the two values falls within a first threshold range.

The sensor diagnostic method then compares a second difference between the value measured at the second sensor and the value measured at the third sensor to determine whether the difference between the second value and the third value falls within a second threshold range.

The sensor diagnostic method can thus determine whether a sensor is behaving rationally in respect to the other sensors by finding measurement differences falling outside the threshold range.

In another embodiment of the invention a temperature sensor diagnostic apparatus includes a first, second, and third temperature sensors physically spaced from one another. The sensors are configured such that a first temperature difference between temperatures sensed at the first sensor and the temperatures sensed at the second sensor are determined. The sensors are further configured such that a second temperature difference is determined between the temperatures sensed at the second temperature sensor and the third temperature sensor.

The first and second temperature differences are compared to threshold temperature levels to determine whether the first and second temperature differences fall within acceptable ranges. If the first or second temperature difference falls outside an acceptable range, the first and second temperature differences are compared to determine the rationality of the sensors based on the temperature difference comparison.

BRIEF DESCRIPTION OF THE DRAWINGS

In order that the advantages of the invention will be readily understood, a more particular description of the invention will be rendered by reference to specific embodiments illustrated in the appended drawings, which depict only typical embodiments of the invention and are not to be considered limiting of its scope, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are supplied to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
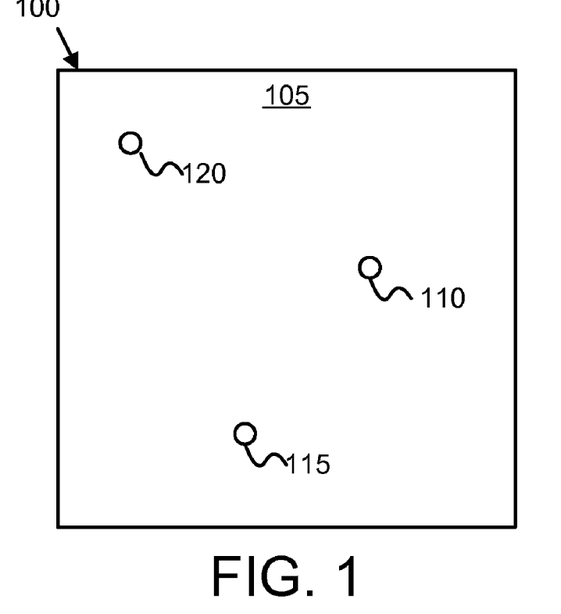
FIG. 1 is a schematic representation of one embodiment of a condition sensor arrangement according to the present invention.

FIG. 1 depicts an embodiment of a temperature sensing apparatus 100 according to the present invention. The temperature sensing apparatus 100 includes a substrate 105 and temperature sensors 110, 115, and 120.

Figure 2:
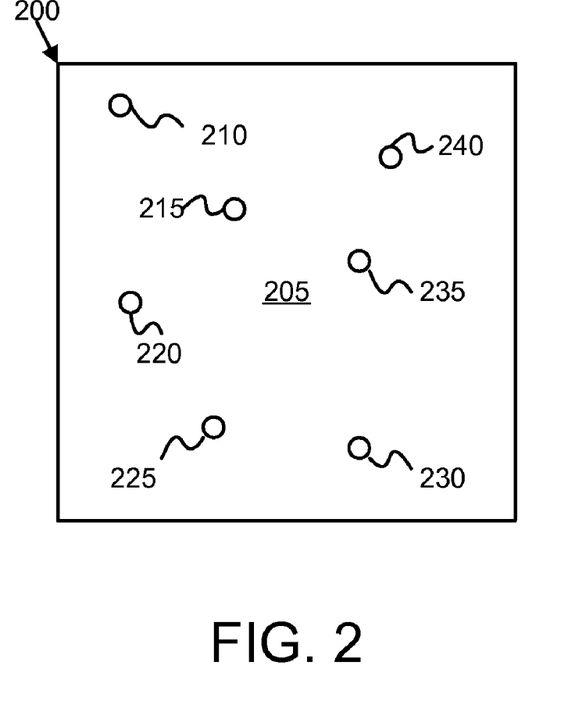
FIG. 2 is a schematic representation of another embodiment of a condition sensor arrangement according to the present invention.

The scope of the invention also includes embodiments such as that shown in FIG. 2, which depicts a temperature sensing apparatus 200 comprising a substrate 205 containing additional temperature sensors 210, 215, 220, 225, 230, 235, 240. The additional temperature sensors are not limited to seven but must be at least three. The substrate 205 need not be planar, but may be three dimensional with sensors located in different locations on the substrate, such as would be found on internal combustion engine.

Figure 3:
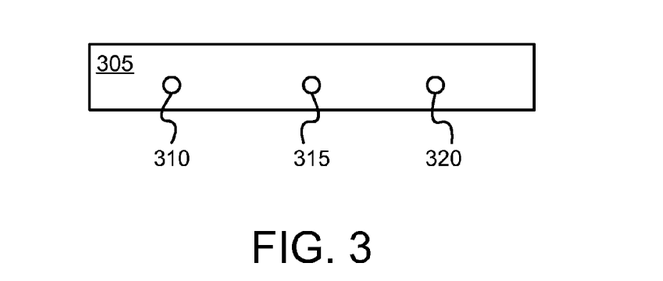
FIG. 3 is a schematic representation of another embodiment of a condition sensor arrangement according to the present invention.

The temperature sensors can be randomly placed throughout the substrate as shown in FIG. 1 and FIG. 2 or they may be placed in a linear or other more systematic arrangement such as is shown in FIG. 3. FIG. 3 shows a substrate 305 containing temperature sensors 310, 315 and 320. One example of temperature sensors placed in a logical order would be temperature sensors located inline on an internal combustion engine exhaust system.

Figure 4:
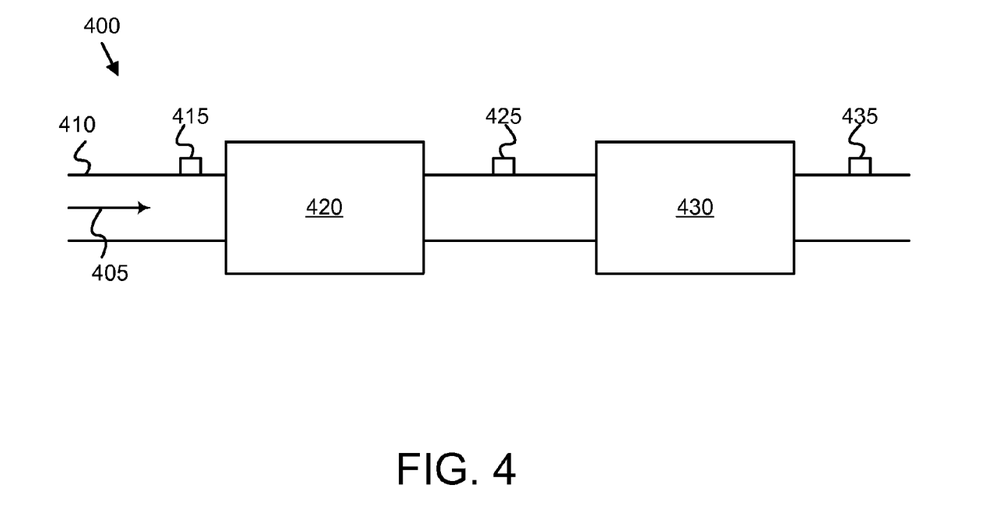
FIG. 4 is a schematic representation of another embodiment of a condition sensor arrangement according to the present invention as used in an exhaust aftertreatment system.

Turning now to FIG. 4, the apparatus 400 illustrates an exhaust aftertreatment system receiving exhaust gas an internal combustion engine (not shown). The exhaust gas is contained within exhaust tubing 410 and proceeds in the direction shown by arrow 405. The exhaust gas passes a thermistor 415 where the temperature is measured. The exhaust gas passes through a diesel oxidation catalyst 420 and past a thermistor 425 where the temperature is measured. The exhaust gas passes through a diesel particulate filter 430 and is measured by a thermistor 435. While thermistors are used in this embodiment, one skilled in the art would recognize that other temperature sensors or measuring devices could be used without departing from the spirit of the current invention.

In the embodiment in FIG. 4, for descriptive purposes and not intended to limit the invention in any way, the thermistor 415 may be termed the diesel oxidation catalyst in thermistor, the thermistor 425 may be termed the diesel oxidation catalyst out thermistor and the thermistor 435 may be termed the diesel particulate filter out thermistor. These terms will be more fully discussed in reference to FIG. 7.

Figure 5:
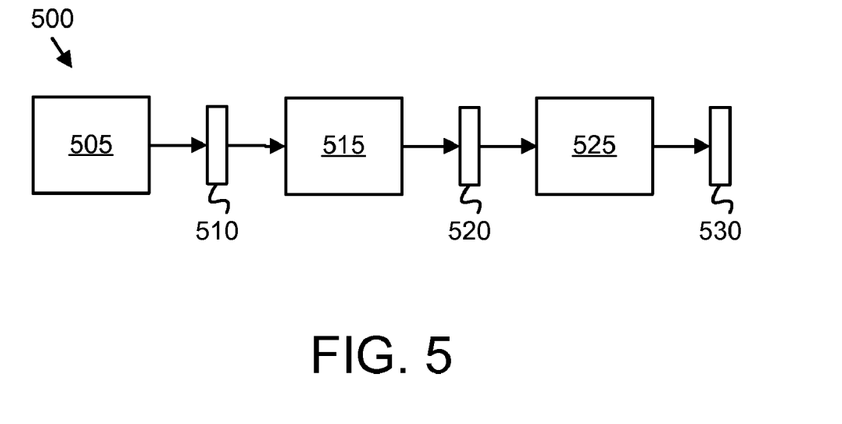
FIG. 5 is a schematic diagram showing one embodiment of a temperature measurement system according to the present invention.

The embodiment shown in FIG. 4 illustrates a diesel oxidation catalyst 420 and a diesel particulate filter 430, however, one skilled in the art would recognize that other exhaust aftertreatment components could be substituted in these positions A schematic diagram showing a number of temperature measurements for diagnosing temperature sensor rationality in one embodiment of the current invention is shown in FIG. 5. In this embodiment, an internal combustion engine 505 produces an exhaust gas which flows in the direction indicated by the arrows. As can be seen in this embodiment, the temperature measurements of the exhaust gas are taken at the entrance of a diesel oxidation catalyst 515 by a thermistor 510. Exhaust gas temperature is also measured at the exit of the diesel oxidation catalyst by a thermistor 520 and at the exit of a diesel particulate filter 525 by thermistor 530.

The schematic flow chart diagrams and method schematic diagrams shown herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
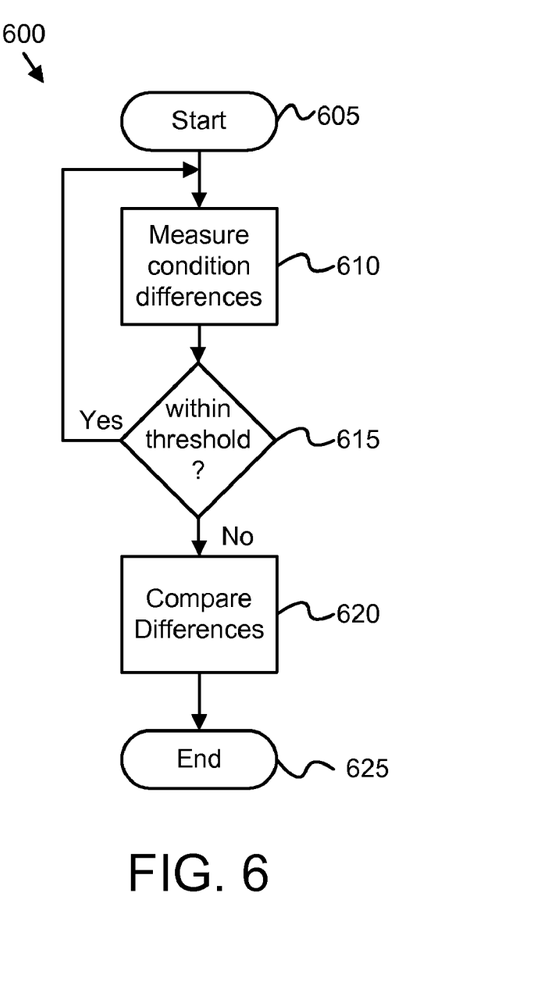
FIG. 6 is a flow chart diagram showing one embodiment of a method according to the present invention of diagnosing sensor rationality.

FIG. 6 illustrates an embodiment of a method 600 of determining sensor rationality, such as temperature sensor rationality, according to the present invention. The method 600 depicts an embodiment used for testing sensor rationality in an exhaust gas aftertreatment system of a diesel engine, but may be generalized for use in any sensor configuration. As shown, the method 600 begins in a block 605, and the delta, or differential, temperatures are measured by temperature measuring sensors such as the thermistors 510, 520 and 530. A controller or other device or person then determines whether the delta temperatures are within a threshold, block 615. If yes, then no further analysis is performed and the method returns to the start 605 to begin again. If the delta temperatures are outside the threshold, then the delta temperatures are compared to determine which thermistor temperature sensor or other measuring device is irrational.

The delta temperature of the present invention refers to the temperature difference between two thermistors, sensors or other temperature measuring devices. As used in the present invention the first thermistor and the second thermistor means a first and second thermistor measured and not necessarily the first and second thermistor in a series although the may be. The delta temperature may be measured at a specific point in time, or in a preferred embodiment, the delta temperature may refer to a running average temperature difference between two sensors, thermistors or other temperature measuring devices.

Figure 7:
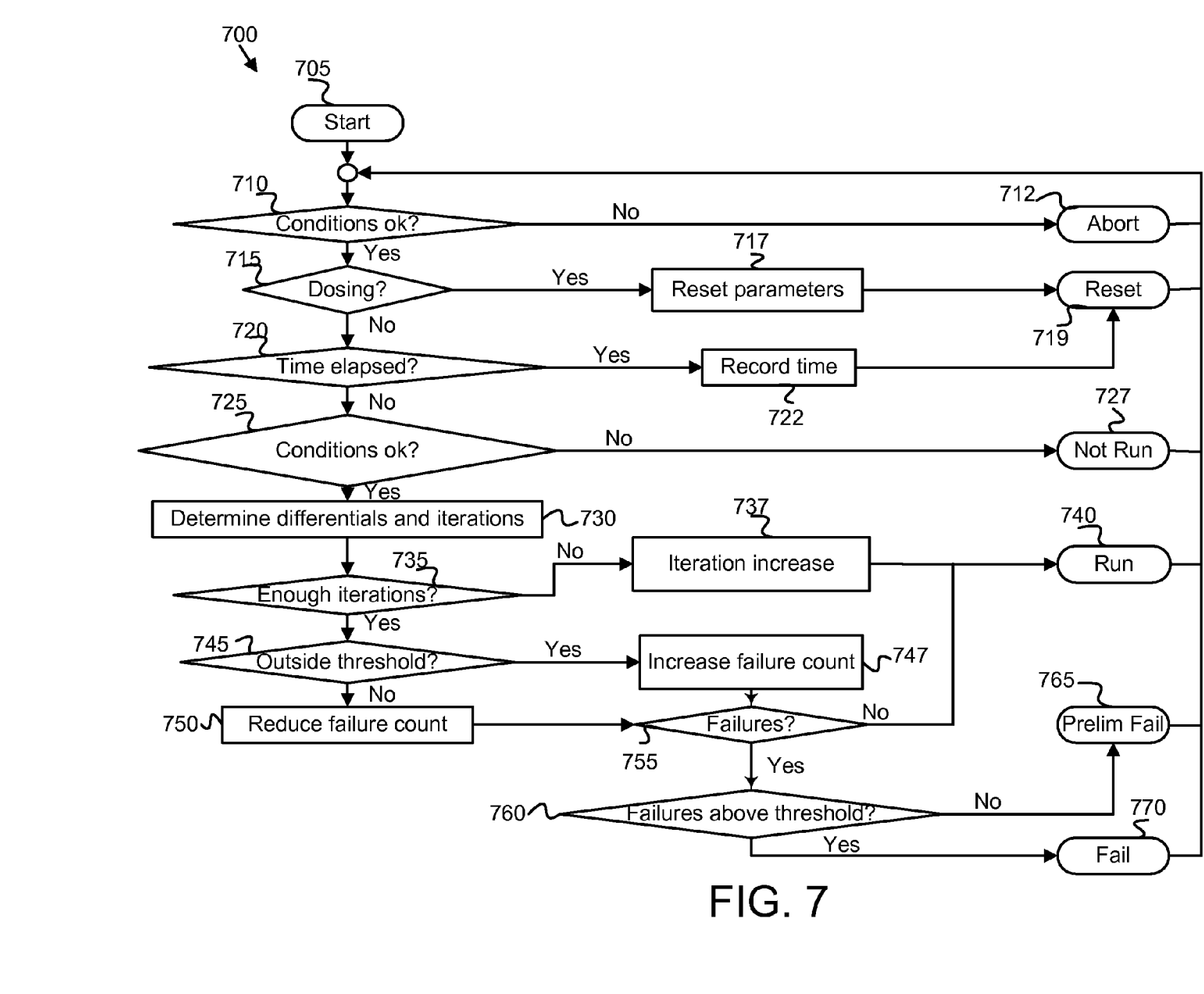
FIG. 7 is a flow chart diagram showing another embodiment of a method according to the present invention of diagnosing sensor rationality.

FIG. 7 shows further detail of one embodiment of a method 700 of determining temperature sensor rationality according to the present invention. As shown, the method 700 begins in block 705, and the system is checked for enabling conditions in block 710. Examples of enabling conditions checked in block 710 include checking for circuit continuity in the thermistors or other electronics, checking for exhaust flow errors and checking for hydrocarbon (HC) dosing faults where the HC doser is acting improperly. If any of the enabling conditions are not met, the diagnostic aborts by setting the diagnostic status to abort in block 712 and returns to the start 705.

In block 715, the doser is checked to determine if the DPF is regenerating. If the DPF is being regenerated, the diagnostic is reset until the regeneration event stops by setting the status to reset in block 719. If the diagnostic is reset 719, the items reset in block 717 include resetting number of samples taken to zero, the running sum differences in thermistors is reset to zero and the time recorded is reset to zero.

Once the DPF stops regenerating, the exhaust system must return to non HC dosing temperature levels. In block 720 the system checks to see whether the diagnostic has been reset and continued past the HC dosing check in block 715 enough times for the system to be at non HC dosing temperature levels. Additional time is recorded in block 722 and the system is reset 719.

Block 725 checks to determine whether sensors are within the enabled range of the diagnostic. Once the exhaust system has cooled enough the diagnostic checks to see whether the diesel oxidation catalyst inlet thermistor 415, diesel oxidation catalyst out thermistor 425, and diesel particulate filter outlet thermistor 435 are within the enabled range of the diagnostic. The exhaust flow and engine speed are also checked against a threshold to determine whether they are within the enabled range. If all of the thermistors are out of the threshold, the diagnostic will not run 727.

If the diesel oxidation catalyst inlet thermistor 415, diesel oxidation catalyst outlet thermistor 425, diesel particulate filter outlet thermistor 435, exhaust flow and engine speed are within the enabled range of the diagnostic, the diagnostic proceeds to block 730. In block 730 the delta temperatures are taken across the diesel oxidation catalyst 420 and the diesel particulate filter 430. The delta temperature across the diesel oxidation catalyst 430 is the difference in temperature measured at the diesel oxidation catalyst inlet thermistor 415 and the temperature at the diesel oxidation catalyst outlet thermistor 425. The delta temperature across the diesel particulate filter is the difference in temperature measured at the diesel oxidation catalyst outlet thermistor 425 and the temperature at the diesel particulate filter outlet thermistor 435.

The delta temperatures are a running average and are logged in block 730. Block 730 also logs how many times it has run.

In block 735 the system determines whether it has run enough times to run a diagnostic. This determination is made by comparing the number of times the system has measured and logged the delta temperature with a threshold level as shown in block 730. If the system has not run enough times to run the diagnostic, the system is incremented by one additional measurement in block 737 and the diagnostic state is set to run in block 740.

In block 745, where the system has run enough times as determined in block 735, the delta temperatures for the diesel oxidation catalyst 420 and the diesel particulate filter 430 are compared against a threshold level. The threshold may have both an upper temperature threshold and a lower temperature threshold.

If the delta temperatures are determined to be outside the threshold level in block 745, the event is logged as a failure and the logged number of times the system has run as logged in block 737 is reset to zero. The delta temperature log as logged in block 730 is also reset to zero in block 747.

In block 750, where the delta temperatures are determined to be within the threshold levels, a failure counter is reduced by one and the logged number of times the system has run as logged in block 737 is reset to zero. The delta temperature log as logged in block 730 is also reset to zero in block 750.

In block 755, the failure counter is checked to see if there have been any recent failures. If the system has not had any recent failures the diagnostic state is set to run in block 740 and the system is reset. If however there are failures logged, the failures are compared against a threshold in block 760.

If the number of failures in block 760 are greater than or equal to the threshold level, the diagnostic records that one or more thermistors have failed 765. If the failures in block 760 are less than the threshold level, the diagnostic state is set to preliminary failure 770 and the system is reset to the start 705.

Figure 8:
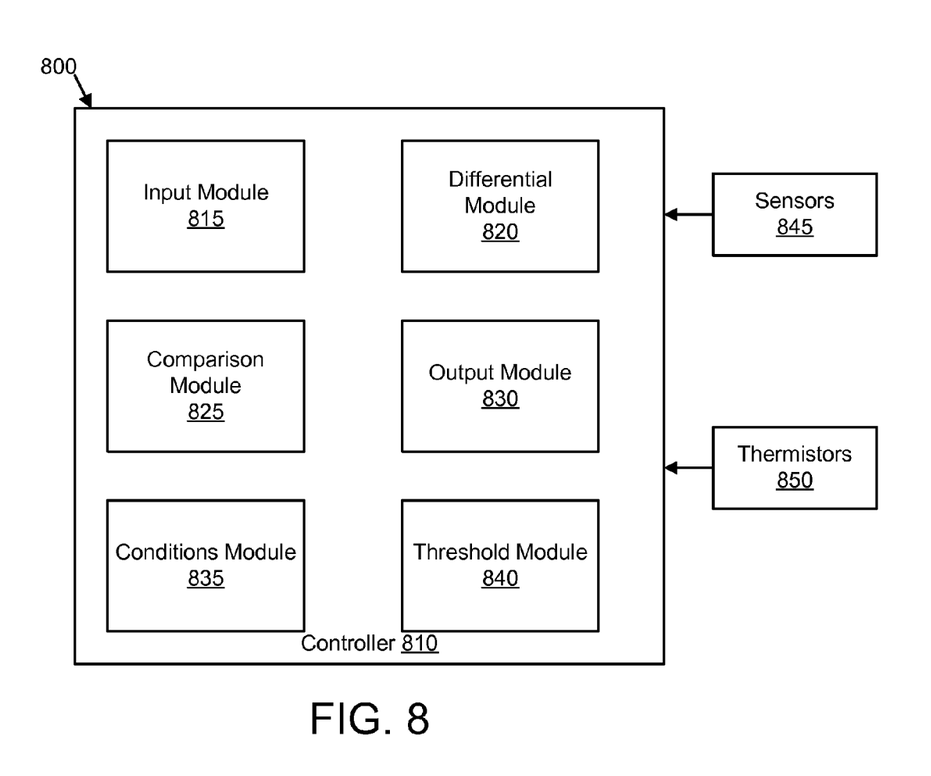
FIG. 8 is a schematic block diagram illustrating one embodiment of a control system according to the present invention.

Referring now to FIG. 8, one embodiment of a thermistor diagnostic control system 800 according to the invention is shown. As depicted, the control system 800 includes a controller 810, one or more sensors 845, and thermistors 850. The controller 810 includes an input module 815, a conditions module 835, a temperature difference module 820, a threshold module 840, a comparison module 825, and an output module 830.

As is known in the art, the controller 810 and components may comprise processor, memory, and interface modules that may be fabricated of semiconductor gates on one or more semiconductor substrates. Each semiconductor substrate may be packaged in one or more semiconductor devices mounted on circuit cards. Connections between the modules may be through semiconductor metal layers, substrate-to-substrate wiring, or circuit card traces or wires connecting the semiconductor devices.

The system 800 operatively controls an engine and exhaust aftertreatment system containing aftertreatment devices and thermistors, such as those shown in FIG. 4, the thermistors 415, 425, and 435 of that figure corresponding to thermistors 850. As previously described, the thermistors 850 monitor the temperature differential across aftertreatment devices contained in the exhaust aftertreatment system, being particularly useful during regeneration of the aftertreatment devices. The sensors 845 may comprise other temperature sensors located in the exhaust aftertreatment system or elsewhere in the engine, pressure sensors, exhaust flow sensors, and/or other engine and exhaust conditions sensors.

The controller 800 in the depicted embodiment controls the operation of a thermistor rationality diagnostic, such as depicted above. In many cases the controller 800 will be part of or comprise an engine/exhaust aftertreatment electronic control module, controlling other operations of the engine and/or exhaust aftertreatment system.

The input module 815 is configured to receive a plurality of inputs from the sensors 845 and thermistors 850, the inputs corresponding to temperatures and other conditions determined by the sensors 845 and thermistors 850. The conditions module 835 is configured to determine whether the conditions are sufficient to conduct or continue the thermistor rationality diagnostic test.

The temperature difference module 820 is configured to determine temperature differences between the thermistors 850. For example, with reference to FIG. 4, the temperature difference module 820 would use the temperatures received from the thermistors 415 and 425 to determine the temperature difference over the diesel oxidation catalyst 420. It would also in this embodiment use the temperatures received from the thermistors 425 and 435 to determine the temperature difference over the diesel particulate filter 430.

The threshold module 840 is configured to determine whether the temperature differences fall within a threshold range. For example, again with reference to FIG. 4, if the threshold range for the temperature difference over the oxidation catalyst 420 and particulate filter 430 is 15 degrees, the threshold module 840 determines whether the devices 420 and 430 are outside or inside that range. The threshold range may vary from application to application and even over time in the same application.

The comparison module 825 is configured to compare the temperature differences and determine a fault or irrationality of one or more of the thermistors 850 based on the comparison. Further detail regarding the comparison can be found below with regard to FIG. 9.

The output module 830 is configured to output the determination reached by the comparison module 825, such as, in the case of a diesel truck using the inventive apparatus, lighting a dashboard light.

Figure 9:
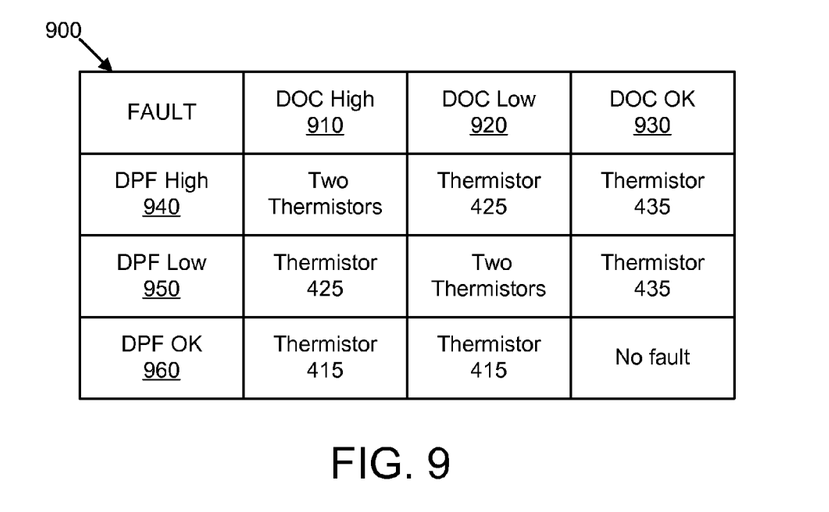
FIG. 9 is a chart illustrating one embodiment of a method of determining sensor rationality according to the invention.

Referring now to FIG. 9, one embodiment of a method of comparison 900 used in the present invention, such as that conducted by the comparison module 825, is shown in the form of a graph. The method 900 will be described with regard to apparatus 400 shown in FIG. 4, but may be used for any of the apparatus described herein or other related apparatuses, as will be apparent to those skilled in the art in light of this disclosure. The same principles shown in the method 900 may be used in other embodiments, which may not necessarily measure temperature but other conditions. Different numbers of sensors may be used, as long as it is at least three, with similar comparisons between thermistors simply being added to the method as needed.

Three temperature differential values 910, 920, and 930 over the oxidation catalyst 420 are shown, the value 910 being above the determined threshold range, the value 920 being below the threshold range, and the value 930 being within the threshold range. Similarly, three temperature differential values 940, 950, and 960 over the particulate filter 430 are shown, the value 940 being above the threshold range, the value 950 being below the threshold range, and the value 960 being within the threshold range.

In the case of the aftertreatment devices showing temperature differential values 910 and 940 (both above the threshold range, i.e., high, or positive), it is determined that at least two of the thermistors 415, 425, and 435 are in error (a fault, or irrational). In this situation, it cannot be determined from this algorithm which thermistors are the ones in error, though most likely one of them is thermistor 415, since in an exhaust aftertreatment system it is the one most likely to fail. The operator may then choose to systematically diagnose the system by replacing the thermistor 415 and running the diagnostic again to find the other malfunctioning thermistor.

In the case of the aftertreatment devices showing temperature differential values 920 and 950 (both below the threshold range, i.e., low, or negative), similarly to the situation above, it is determined that at least two of the thermistors 415, 425, and 435 are in error (a fault, or irrational). It cannot be determined from this algorithm which thermistors are the ones in error, though most likely one of them is the thermistor 415, since in an exhaust aftertreatment system that is the one most likely to fail. The operator may then choose to systematically diagnose the system by replacing the thermistor 415 and running the diagnostic again to find the other malfunctioning thermistor.

In the case of the aftertreatment devices showing temperature differential values 930 and 960 (both within the threshold range), it is determined that the thermistors 415, 425, and 435 are all functioning properly. Theoretically, the diagnostic would fail in a this case if all three thermistors are irrational in the same direction and to the same degree, but such a possibility is so remote as to be, in practical terms, non-existent.

In the case of the oxidation catalyst 420 having a temperature differential value 910 (high) and the particulate filter 430 having a temperature differential value 950 (low), it is determined that the thermistor 425 is in error. The same conclusion is reached with the values 920 and 940. This is because if the thermistor 425 measures an inaccurate temperature, it will create an opposite but equal imbalance over both aftertreatment devices.

In the case of values 910, and 960 (as well as 920 and 960), it is determined that the thermistor 415 is in error. Since the temperature differential over the particulate filter 430 is as expected, the method 900 concludes that the thermistors 425 and 435 are operating properly, leaving the thermistor 415 the culprit of the bad reading over the diesel oxidation catalyst 420.

In the case of values 930 and 940 (as well as 930 and 950), it is determined that the thermistor 435 is in error. Since the temperature differential over the oxidation catalyst 420 is as expected, the method 900 concludes that the thermistors 415 and 425 are operating properly, leaving the thermistor 435 the culprit of the bad reading over the particulate filter 430.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A sensor diagnostic method comprising:

causing a first sensor to sense a first condition value, a second sensor to sense a second condition value, and a third sensor to sense a third condition value;

measuring a first condition difference between the first and second condition values;

determining whether the first condition difference falls within a first threshold range;

measuring a second condition difference between the second and third condition values;

determining whether the second condition difference falls within a second threshold range;

comparing the first condition difference to the second condition difference to determine the rationality of the first sensor, the second sensor, and the third sensor; and identifying at least one of the first sensor, the second sensor, and the third sensor as irrational where one of the first condition difference and the second condition difference falls outside the first threshold range and the second threshold range respectively;

wherein if the first condition difference falls below the first threshold range and the second condition difference falls below the second threshold range, at least two of the sensors are determined to be irrational.

2. The method of claim 1, wherein if the first condition difference falls within the first threshold range and the second condition difference falls within the second threshold range, the sensors are determined to be rational.

3. The method of claim 1, wherein if the first condition difference falls outside the first threshold range and the second condition difference falls within the second threshold range, the first sensor is determined to be irrational and the second and third sensors are determined to be rational.

4. The method of claim 1, wherein if the first condition difference falls within the first threshold range and the second condition difference falls outside the second threshold range, the first and second sensors are determined to be rational and the third sensor is determined to be irrational.

5. The method of claim 1, wherein if the first condition difference falls above the first threshold range and the second difference falls above the second threshold range, at least two of the sensors are determined to be irrational.

6. The method of claim 1, wherein if the first condition difference falls above the first threshold range and the second condition difference falls below the second threshold range, the second sensor is determined to be irrational and the first and third sensors are determined to be rational.

7. The method of claim 1, wherein if the first condition difference falls below the first threshold range and the second condition difference falls above the second threshold range, the second sensor is determined to be irrational and the first and third sensors are determined to be rational.

8. The method of claim 1, wherein the condition differences are average condition differences.

9. The method of claim 1, wherein the sensors comprise temperature sensors, the condition values comprise degrees of temperature, and the condition differences comprise differences in temperature.

10. The method of claim 9, wherein the first sensor senses temperature at the inlet of a first diesel engine exhaust aftertreatment device, the second sensor senses temperature between the outlet of the first aftertreatment device and the inlet of a second aftertreatment device, and the third sensor senses temperature at the outlet of the second aftertreatment device.

11. A thermistor servicing method comprising:

providing an engine exhaust aftertreatment system, the system comprising first, second, and third thermistors spaced along the exhaust flow stream;

removing a thermistor from the system after reaching a determination that the thermistor is irrational on the basis of a diagnostic test, the test comprising measuring a first temperature difference between the first thermistor and the second thermistor, determining whether the first temperature difference falls outside of a first temperature threshold range, measuring a second temperature difference between the second thermistor and the third thermistor, determining whether the second temperature difference falls outside of a second temperature threshold range, and making a comparison of the first temperature difference to the second temperature difference, identifying at least one of the first thermistor, the second thermistor, and the third thermistor as irrational where one of the first temperature difference and the second temperature difference falls outside the first temperature threshold range and the second temperature threshold range respectively;

installing a new thermistor.

12. A signal bearing medium tangibly embodying a program of machine-readable instructions executable by a digital processing apparatus to perform operations to diagnose the rationality of a plurality of sensors, the operations comprising:

measuring a first condition difference between a first sensor and a second sensor;

determining whether the first condition difference falls within a first threshold range;

measuring a second condition difference between the second sensor and a third sensor;

determining whether the second difference falls within a second threshold range;

comparing the first condition difference to the second condition difference; and identifying at least one of the first sensor, the second sensor, and the third sensor as irrational where one of the first condition difference and the second condition difference falls outside the first threshold range and the second threshold range respectively;

wherein the condition differences comprise differences in temperature.

13. The signal bearing medium of claim 12, wherein the instructions further comprise determining the rationality of at least one of the sensors.

14. An engine exhaust aftertreatment system capable of diagnosing thermistor rationality comprising:

a first thermistor, a first aftertreatment device, a second thermistor, a second aftertreatment device, and a third thermistor, all arranged in series in an exhaust gas flow;

a plurality of conditions sensors disposed in the aftertreatment system;

a controller comprising an input module configured to receive a plurality of inputs corresponding to conditions and temperatures determined by the sensors and thermistors, a conditions module configured to determine whether the conditions are sufficient to conduct or continue a thermistor rationality diagnostic test, a temperature difference module configured to determine a first temperature difference over the first aftertreatment device, based on the first and second thermistor temperature readings, and a second temperature difference over the second aftertreatment device, based on the second and third thermistor temperature readings, a threshold module configured to determine whether the first and second temperature differences fall within a threshold range, a comparison module configured to compare the first and second temperature differences and determine a fault of one or more of the first thermistor, the second thermistor, and the third thermistor based on the comparison of the first and second temperature differences, an output module configured to output the determination made by the comparison module.

15. The system of claim 14, wherein the engine is a diesel engine, the first aftertreatment device is a diesel oxidation catalyst, and the second aftertreatment device is a diesel particulate filter.

16. The system of claim 14, wherein the temperature differences are an accumulation of temperature differences averaged over time.

17. A temperature sensor diagnostic apparatus comprising:
first, second, and third temperature sensors physically spaced from one another;
means for determining a first temperature difference between temperatures sensed by the first and second sensors and a second temperature difference between temperatures sensed by the second and third sensors
means for determining whether the first and second temperature differences fall within acceptable ranges;
means for comparing the first and second temperature differences;
means for determining the rationality of each of the sensors based on the temperature difference comparison; and
means for identifying an irrational sensor based on the determined rationality of each of the sensors.

18. The apparatus of claim 17, wherein the temperature differences are average temperature differences.

19. An engine exhaust aftertreatment thermistor rationality diagnostic method comprising:
determining whether engine and exhaust conditions are satisfactory for conducting a rationality test;
determining a first temperature differential over a first aftertreatment device and adding the first differential to previous first differential values obtained during the rationality test;
determining a second temperature differential over a second aftertreatment device and adding the second differential to previous second differential values obtained during the rationality test;
determining whether sufficient time has passed for the rationality test to be reliable;
averaging the sums of the first and second temperature differentials, respectively;
determining whether the averages fall within a threshold range;
comparing the averages to each other;
assigning a fault to one or more thermistors associated with the aftertreatment devices based on the averages comparison; and
identifying the one or more thermistors at fault in response to assigning a fault to the thermistor.

20. The method of claim 19, wherein the engine is operating during execution of the method.

21. The method of claim 19, further comprising repeating the method until the number of faults for a particular thermistor exceeds a fault threshold, and further comprising labeling the thermistor whose faults exceed the threshold irrational.

* * * * *